United States Patent [19]

Teyssié et al.

[11] Patent Number: 4,461,874

[45] Date of Patent: Jul. 24, 1984

[54] BLOCK COPOLYMERS OF CONJUGATED DIENES OR VINYL SUBSTITUTED AROMATIC HYDROCARBONS AND ACRYLIC ESTERS AND PROCESS FOR THEIR MANUFACTURE

[75] Inventors: Philippe Teyssié, Neuville; Robert Jéôme, Tilff; Trazollah Ouhadi, Liege; Roger Fayt, Neuville, all of Belgium

[73] Assignee: Cosden Technology, Inc., Dallas, Tex.

[21] Appl. No.: 431,961

[22] Filed: Oct. 1, 1982

[30] Foreign Application Priority Data

Oct. 2, 1981 [FR] France ................................ 81 18756

[51] Int. Cl.³ .................... C08F 297/02; C08F 297/04
[52] U.S. Cl. .................................. 525/271; 525/299; 525/309; 525/310
[58] Field of Search ................ 525/299, 271, 309, 310

[56] References Cited

U.S. PATENT DOCUMENTS

| | | | |
|---|---|---|---|
| 3,198,854 | 8/1965 | Warner | 525/271 |
| 3,699,190 | 10/1972 | Shimomura | 525/299 |
| 3,739,042 | 6/1973 | Chu | 525/299 |
| 3,890,408 | 6/1975 | Schepers | 525/271 |
| 3,937,760 | 2/1976 | Cole | 525/310 |
| 4,169,115 | 9/1979 | Tung | 525/271 |

*Primary Examiner*—John C. Bleutge
*Assistant Examiner*—Patricia Short
*Attorney, Agent, or Firm*—Robert H. Sproule; Russell H. Schlattman; M. Norwood Cheairs

[57] ABSTRACT

Block copolymers having a first sequence formed with a conjugated diene or a vinyl substituted aromatic hydrocarbon other than alpha-methylstyrene, a second sequence formed with an acrylic ester, and a linking intermediate sequence formed with alpha-methylstyrene. An anionic polymerization process is used to form these block copolymers.

12 Claims, No Drawings

BLOCK COPOLYMERS OF CONJUGATED DIENES OR VINYL SUBSTITUTED AROMATIC HYDROCARBONS AND ACRYLIC ESTERS AND PROCESS FOR THEIR MANUFACTURE

BACKGROUND OF THE INVENTION

The present invention relates to new block copolymers comprising a first sequence formed with monomeric units derived from conjugated dienes or vinyl substituted aromatic hydrocarbons other than alpha-methylstyrene, and a second sequence formed with monomeric units derived from acrylic esters. The present invention is also concerned with a process for making these new block copolymers by anionic polymerization.

The making of block copolymers by anionic polymerization as disclosed in W. H. James and D. C. Allport, *Block Copolymers*, 1973, Applied Science Publishers Ltd, pages 62 to 104 hereby incorporated by reference, is well known in the art. It is also known that not only do the block copolymers styrene-acrylic esters obtained in accordance with the usual processes have a branched structure, but in addition their copolymerization is strongly hindered. These drawbacks are due to a side reaction between the ester function and the carbanion which ends the first sequence. In order to avoid this side reaction, it has already been proposed to add diphenyl-1,1-ethylene at the end of the polymerization of the first sequence; however this latter additive is expensive and its purification difficult. There is therefore a need for block coploymers which avoid the above-mentioned side reaction and consequently the formation of a branched sturcture, but which can be obtained without the introduction of an additive such as diphenyl-1,1-ethylene.

SUMMARY OF THE INVENTION

The invention contemplates block polymers having a first sequence formed with monomeric units derived from the group consisting of a conjugated diene and a vinyl subtituted aromatic hydrocarbon other than alpha-methylstyrene, a second sequence formed with monomeric units derived from an acrylic ester, and an intermediate sequence formed with monomeric units derived from alpha-methylstyrene to link the first and second sequences.

The invention also contemplates a process for making the block copolymers by successively polymerizing, through anionic polymerization, conjugated dienes or vinyl substituted aromatic hydrocarbons other than alpha-methyl styrene, alpha-methylstyrene, and acrylic esters.

DESCRIPTION OF THE PREFERRED EMBODIMENT

This invention is particularly concerned with providing block copolymers including a first sequence formed with monomeric units derived from conjugated dienes or vinyl substituted aromatic hydrocarbons other than alpha-methylstyrene, a second sequence formed with monomeric units derived from acrylic esters, and an intermediate sequence formed with monomeric units derived from alpha-methylstyrene to link the first and second sequences. The block copolymers of the present invention may consist only of the foregoing cited sequences or may comprise additional sequences if the addition of such sequences is possible.

Any conjugated diene may be used to form the monomeric units of the first sequence. Generally such conjugated dienes, which may or may not be substituted or not, contain 4 to 12 carbon atoms; however the unsubstituted conjugated dienes having from 4 to 8 carbon atoms are preferred. Examples of such dienes, include 1,3-butadiene; isoprene; 2,3-dimethyl-1,3-butadiene; 1,3-pentadiene (piperylene); 2-methyl-3-ethyl-1,3-butadiene; 3-methyl-1,3-pentadiene; 2-ethyl-1,3-pentadiene; 1,3-hexadiene; 2-methyl-1,3-hexadiene; 1,3-heptadiene; 3-methyl-1,3-heptadiene; 1,3-octadiene; 3,4-dimethyl-1,3-hexadiene; 2-phenyl-1,3-butadiene. It should be noted that isoprene and 1,3-butadiene are particularly preferred. Any vinyl substituted aromatic hydrocarbons may also be used in the monomeric units of the first sequence. These vinyl substituted hydrocarbons may have one or two benzene nuclei. The aromatic hydrocarbons containing from 8 to 16 carbon atoms are preferred. Examples of such compounds are styrene, 3-vinyltoluene, 4-vinyltoluene, alpha-vinylnapthalene, and 2-vinylnaphthalene; however styrene is particularly preferred.

Any acrylic esters may be used in the monomeric units of the second sequence. Generally, those acrylic esters have a linear or branched structure, containing from 4 to 17 carbon atoms, and preferably from 4 to 10 carbon atoms. Examples of such acrylic esters include methyl methacrylate, ethyl methacrylate, butyl acrylate, ethylhexyl acrylate, methyl acrylate, ethyl acrylate, isopropyl acrylate, butylmethacrylate and hexylmethacrylate; however, methyl methacrylate is preferred.

The chain lengths of the first and second sequences are not critical. Generally the average molecular weight of the first sequence is between 20,000 and 1,000,000 preferably between 10,000 and 500,000, and more preferably between 25,000 and 200,000. The average molecular weight of the second sequence is generally between 200 and 1,000,000, preferably between 5,000 and 500,000, and more preferably between 25,000 and 200,000. The length of the chain of the intermediate sequence may also vary between wide limits. However, there is no particular advantage in using a long intermediate sequence, and therefore its molecular weight is generally lower than 10,000, and preferably lower than 1,000.

In each of the first and second sequences respectively, the monomeric units may be different, but they are preferably identical. The block copolymers of the present invention have generally a linear structure.

The present invention is also concerned with a process for making the above described block copolymers. The process includes three successive steps to anionically polymerize a first sequence of conjugated dienes or vinyl substituted aromatic hydrocarbons other than alpha-methylstyrene, a second sequence of acrylic esters, and an intermediate sequence of alpha-methylstyrene.

The operating conditions which are used in the anionic polymerization process of the invention are those usually employed in the art for this type of polymerization. The initiator may be selected from the initiators usually employed in anionic polymerization processes. Generally these are organometallic compounds derived from alkali metals, the organic radicals of which are aryl, alkyl, cycloalkyl or arylalkyl radicals which contain from 1 to 12, and preferalby from 4 to 10 carbon atoms; however, among these cited compounds, the organolithium compounds are preferred. Examples of such preferred initiators include, butyllithium, lithium naphthalene, ethyllithium, hexyllithium, styrenelithium, and cyclopentyllithium. The amount of initiator used, based on the amount of monomer used to form the first sequence, may vary within wide limits, and depends on the nature of initiator and the type of monomer; generally, however, between about 0.1 and about 100 millimoles of initiator per hundred grams of monomer is a desirable amount.

According to a preferred embodiment of the process of the present invention, an alkaline organometallic compound derived from alpha-methylstyrene is used as initiator. The alkaline organometallic compound is synthesized before beginning polymerization by adding at least an equimolar amount of alpha-methylstyrene to one of those initiators usually employed in anionic polymerization and previously discussed herein, preferably butyllithium. This preferred embodiment is particularly advantageous when the monomers which are used to form the first sequence have a polymerization rate higher than that of alpha-methylstyrene; for example styrene, butadiene and isoprene have such a polymerization rate. According to these conditions, alpha-methylstyrene may be used in a molar excess in order to have a certain excess amount of it at the end of the manufacture of the first sequence. This excess of alpha-methylstyrene is located at the end of the chain of the first sequence in order to form the intermediate sequence. Therefore it becomes unnecessary to specially add alpha-methylstyrene.

According to the process of the invention, a solvent is generally used, preferably a polar solvent. Examples of such solvents are tetrahydrofurane; ether type solvents such as dioxane, diethylether, diisopropylether, dibutylether, ethyleneglycol or dimethylether; benzene, xylene, toluene or naphthalene; tetrahydrofurane being a particularly preferred solvent. The amount of solvent to be used is not critical. Before starting the polymerization, it is advantageous to avoid the detrimental action of impurities which could deactivate the anionic centers. To this end, an excess of initiator may be added to the solvent before introducing the monomers. The temperature at which the polymerization is carried out may vary within wide limits and typically depends on the nature of the monomers, on the eventual solvent, and on the initiator. Generally, the temperature is between −100° C. and 50° C. Usually, the polymerization is carried out under pressures sufficient to maintain the monomers in the liquid phase. The selected pressure therefore depends on the particular products which are polymerized and upon the solvent used and on the temperature. Usually, the polymerization is carried out at the autogenous pressure. However pressures different from autogenous pressure may also be used. The polymerization may be carried out in a continuous or a batch process. The monomers may be added either in one stage, batchwise, or even continuously.

Generally the living block copolymers are deactivated at the end of the polymerization by conventional means such as the addition of an alcohol or a carboxylic acid. Thereafter the block copolymer is filtered and recovered. It is then dried, generally under vacuum with a conventional drying device. The copolymerization process of the invention may be carried out in any suitable device. The block copolymers of the invention are particularly useful for the manufacture of adhesives, coatings and fibers.

The following examples are given to better illustrate the present invention without, however, limiting it.

EXAMPLE 1

3 liters of a tetrahydrofurane solution were introduced into a 5-liter glass vessel fitted with a tap comprising a rubbery membrane allowing the introduction of the solvent and the reactants by means of a syringe or a capillary tube. This vessel had been previously heated under vacuum and filled with nitrogen.

5 ml of alpha-methylstyrene was then added to the tetrahydrofurane solution. The alpha-methylstyrene had been previously dried on calcium hydride, distilled before being passed on fluorenyllithium, and again distilled just before use. The tetrahydrofurane had been previously refluxed on a benzophenone-sodium complex and thereafter distilled. Any impurities which were still present in the prepared solution were destroyed by adding droplets of a 9.6 molar solution of sec-butyllithium in hexane until a red and lasting coloration occurred.

Thereafter 3 ml of the sec-butyllithium solution was added. The mixture was cooled at −78° C. by means of an acetone/carbon dioxide bath and thereafter 110 ml of pure styrene was added to the reaction mixture by means of a capillary tube. During these steps, the reaction mixture became yellow-orange, which was a proof of the formation of the styrile anion. Thereafter the coloration became again dark red, which was characteristic of the methylstyrile anion. The pure styrene had previously been dried on calcium hydride and distilled, and then passed on fluorenyllithium and distilled again just before use.

The reaction mixture was stirred at −78° C. for 90 minutes. Thereafter 110 ml of pure and cold methyl methacrylate was poured slowly into the vessel by the capillary tube. A yellow pale coloration was then observed. The methyl methacrylate had been previously dried on calcium hydride, distilled, passed on triethylaluminium, and distilled again just before use.

After 90 minutes, the anions were deactivated by addition of 5 ml methanol, thereafter the copolymer was precipitated by means of a large excess of methanol. A linear block copolymer of styrene/alpha-methylstyrene/methyl methacrylate was obtained with almost 100% yield, after filtration of the obtained slurry and drying under vacuum at 40° C. The chromatographic determinations under gel permeation indicated a slow polydispersion and a total molecular weight of about 150,000.

EXAMPLE 2

350 ml of a 0.3 volume % styrene solution in benzene was introduced into a 5-liter glass vessel fitted with a tap comprising a rubbery membrane to allow the introduction of the solvent and the reactants by means of a syringe or capillary tube. The vessel previously had been heated under vacuum and filled with nitrogen. The added styrene had been dried on calcium hydride, distilled before being passed on fluorenyllithium and again distilled just before use. The benzene had been refluxed on calcium hydride and distilled. The impurities which were still present in the prepared solution were destroyed by adding droplets of a 0.6 molar solution of sec-butyllithium in hexane until a red and lasting coloration occured.

Thereafter, 1 ml of the sec-butyllithium solution was added, and the reaction mixture was stirred at room temperature for a period of about 15 minutes. The reaction mixture was cooled to −10° C. and 90 ml of pure isoprene was then added. During this step the reaction mixture became pale yellow, which is a characteristic of the isoprenyle anion. The isoprene had previoulsy been dried at low temperature on n-butyllithium, before being distilled.

Polymerization during stirring of the isoprene sequence was maintained for 12 hours at 20° C. Thereafter 1.5 ml of pure alpha-methylstyrene and 2 ml of pure styrene were added. The added alpha-methylstyrene and styrene had been previously dried on calcium hydride, distilled, passed on fluorenyllithium, and again distilled just before use.

The reaction mixture was thereafter heated at 40° C. for 30 minutes and became red. 1.5 l of tetrahydrofurane, previously refluxed on a benzophenone-sodium complex and distilled, was added. The reaction mixture was then cooled at −78° C. When the reaction mixture was cooled at −78° C., 70 ml of pure and cold methyl methacrylate was poured into the vessel. The methyl methacrylate had been previously dried on calcium hydride, distilled, passed on triethylaluminium and again distilled just before use. The methyacrylate polymerization was carried out for 2 hours at 78° C.

A linear block copolymer isoprene/styrene/alphamethylstyrene/methylmethacrylate was obtained with almost 100% yield after filtration of the obtained slurry and drying under vacuum. The chromatographic determinations under gel permeation indicated a slow polydispersion and a total molecular weight of about 220,000.

The embodiments of the invention in which an exclusive property or privilege is claimed are defined as follows:

1. Linear block copolymers comprising a first sequence formed with monomeric units derived from the group consisting of a conjugated diene and a vinyl substituted aromatic hydrocarbon other than alpha-methylstyrene; and a second sequence formed with monomeric units derived from an acrylic ester, the first and second sequences being linked by an intermediate sequence formed with monomeric units derived from alpha-methylstyrene.

2. The block copolymers according to claim 1, wherein the first sequence is formed with monomeric units derived from styrene.

3. The block copolymers according to claim 1, wherein the first sequence is formed with monomeric units derived from isoprene.

4. The block copolymers according to claim 1, wherein the first sequence is formed with monomeric units derived from 1,3-butadiene.

5. The block copolymers according to claim 1 wherein the second sequence is formed with monomeric units derived from methyl methacrylate.

6. The block copolymer according to claim 2 wherein the second sequence is formed with monomeric units derived from methyl methacrylate.

7. The block copolymer according to claim 3 wherein the second sequence is formed with monomeric units derived from methyl methacrylate.

8. The block copolymer according to claim 4 wherein the second sequence is formed with monomeric units derived from methyl methacrylate.

9. A process for making the block copolymers of claim 1, comprising successively polymerizing, by anionic polymerization, monomeric units derived from the group consisting of a conjugated diene and a vinyl substituted aromatic hydrocarbon other than alpha-methylstyrene, monomeric units of alpha-methylstyrene, and monomeric units of acrylic esters.

10. The process according to claim 9 wherein the monomeric units derived from the group consisting of a conjugated diene and a vinyl substituted aromatic hydrocarbon other than alpha-methylstyrene have a polymerization rate much higher than that of alpha-methylstyrene.

11. The process according to claims 9 or 10 additionally comprising adding an alkaline compound derived from alphamethylstyrene to initiate block polymerization.

12. The process according to claim 11 wherein the alkaline compound derived from alpha-methylstyrene is synthesized by adding alpha-methylstyrene in at least an equimolar amount to butyllithium.

* * * * *

UNITED STATES PATENT AND TRADEMARK OFFICE
CERTIFICATE OF CORRECTION

PATENT NO. : 4,461,874
DATED : July 24, 1984
INVENTOR(S) : Philippe Teyssie et al It is certified that error appears in the above-identified patent and that said Letters Patent is hereby corrected as shown below:

Title page:

INVENTORS:

The second inventor's last name is misspelled and should be spelled as follows --Jerome--.

ASSIGNEE:
"Cosden Technology, Inc., Dallas, Tex." should read --Labofina, S. A., Brussels, Belgium--.

Signed and Sealed this

Fifth Day of March 1985

[SEAL]

Attest:

DONALD J. QUIGG

Attesting Officer     Acting Commissioner of Patents and Trademarks